3,401,188
PROCESS FOR MAKING TETRAMETHYL LEAD
Charles Anthony Sandy, Wilmington, Del., assignor to
E. I. du Pont de Nemours and Company, Wilmington,
Del., a corporation of Delaware
No Drawing. Filed Aug. 5, 1965, Ser. No. 477,612
9 Claims. (Cl. 260—437)

ABSTRACT OF THE DISCLOSURE

The production of tetramethyl lead by reacting monosodium lead alloy with liquid methyl chloride in the presence of a polyether catalyst. Water is an optional ingredient in the reaction system.

---

This invention relates to the manufacture of tetramethyl lead, more particularly to its manufacture by the reaction of methyl chloride with monosodium lead alloy in the presence of a novel and improved catalyst system.

For many years, only tetraethyl lead was of commercial value as an antiknock agent for motor gasoline. Therefore, the early art was concerned with developing processes for manufacturing tetraethyl lead and, assuming that all tetraalkyl lead compounds (including tetramethyl lead) could be made in the same manner under the same conditions as tetraethyl lead, alleged that their processes could be used in making all tetraalkyl lead compounds. These early inventors reacted ethyl halides, usually ethyl bromide, with sodium-lead alloys which contained 2 or more atoms of sodium per atom of lead ($Na_4Pb$ or $Na_2Pb$) in the presence of large amounts of water or its equivalent, to react with the excess sodium to release hydrogen and produce strong reducing conditions. They also proposed the use of catalysts, such as amines, e.g., pyridine and aniline, and ethers, in their processes. See for example, Calcott in U.S. Patent 1,559,405 and Midgley, Jr., in U.S. Patent 1,622,228.

However, Calingaert et al., in U.S. Patent 2,270,109, found that methyl chloride alone or in admixture with ethyl chloride could not be made to react successfully with monosodium lead alloy (NaPb) except in the presence of certain metal catalysts, mainly aluminum type catalysts. In U.S. Patent 2,535,190, Calingaert et al. found that ethyl chloride would react well with sodium lead alloy at low temperatures if such alloy also contained a certain amount of magnesium (Mg) and in the presence of alkyl ethers, including polyethers, as catalysts, specifying that the Mg was essential to obtain good results. They also indicated that such process could be used to make all tetraalkyl lead compounds, including tetramethyl lead, but did not disclose any experiments with methyl chloride. In U.S. Patent 2,635,106, Shapiro et al. disclosed that ethyl chloride could be reacted with a sodium-lead alloy containing specified amounts of potassium to produce tetraethyl lead, and that the yield could be increased by the presence of various catalysts, including polyethers. They did not disclose or contemplate the use of methyl chloride or the production of tetramethyl lead.

As disclosed in the more recent art, the manufacture of tetramethyl lead poses difficulties, as discussed by Jarvie et al. in U.S. Patent 3,048,610, Tullio in U.S. Patents 3,072,694 and 3,072,695, and Cook et al. in U.S. Patent 3,049,558. This art suggests that the MeCl-NaPb system is unique since it requires catalysis and certain metal compounds are effective to produce TML. The disclosed processes, however, including the commercial processes involving aluminum compounds, are not entirely satisfactory mainly because the alkyl aluminum derivatives formed in the reaction mass are sensitive to air and moisture and tend to ignite spontaneously on exposure to the atmosphere. Also, the reaction masses are sticky and troublesome to discharge from the reactor.

Kobetz et al., in U.S. Patent 3,192,240, disclose that tetramethyl lead can be made by the reaction of methyl chloride on monosodium lead alloy in the presence of aluminum catalysts in combination with glycol ethers, wherein the glycol ethers are synergists and coact with the aluminum catalysts to improve the yields and the rate of reaction, reduce the amount of aluminum catalyst required, lessen the tendency of the reaction mass to fume off on exposure to air, and facilitate the discharge of the reaction mass from the reactor. They disclose that the aluminum catalysts may be used in the proportions of from about 0.04 to about 0.25 weight percent of the alloy, preferably from about 0.08 to about 0.15 weight percent, and that the polyethers may be employed in the proportion of from about one-fourth to about five moles per gram atom of aluminum, preferably from one-half to about two moles, corresponding to a preferred maximum of 0.025 mole of polyether per mole of alloy. They further disclose that when the polyether was used alone in the proportions found effective as a cocatalyst, they obtained a yield of only 2% of tetramethyl lead.

It is an object of this invention to provide a new and improved process for making tetramethyl lead by the reaction of methyl chloride with monosodium lead alloy. A particular object is to provide such a process which employs a novel and improved catalyst for such reaction which avoids the use of aluminum type catalysts and the hazards and problems involved in their use. A further object is to provide such a process which produces reaction masses that are more easily discharged from the reactor and which renders the manufacture of tetramethyl lead significantly more safe and practical. Other objects are to advance the art. Still other objects and advantages will appear hereinafter.

The above and other objects of this invention are accomplished by the process for making tetramethyl lead which comprises reacting monosodium lead alloy with:

(a) A methylating agent which consists essentially of methyl chloride in the liquid phase, employing at least 1 mole of methyl chloride per mole of alloy, (b) At a temperature of from about 60° C. to about 120° C.

(c) In the presence of from 0.1 to about 1 mole per mole of alloy of a catalyst which consists essentially of at least one polyether of the formula $RO(CH_2CH_2O)_nR'$ wherein R is a member of the group consisting of hydrogen atoms and alkyl groups of 1–2 carbon atoms, R' is an alkyl group of 1–2 carbon atoms, and $n$ is an integer of 1–3.

It has been found that the polyethers as above defined, when employed in the above specified proportions under the above recited conditions, are highly effective to catalyze the reaction of methyl chloride with monosodium lead alloy to produce high yields of tetramethyl lead at least equal to the yields obtained with the aluminum type catalysts, contrary to the teachings of the prior art. The polyethers do not require a metal catalyst such as Mg or the aluminum type catalysts and their use avoids the hazards of making and handling aluminum type catalysts and the difficulties involved in processing reaction masses produced by the use of metal catalysts. Moreover, they produce reaction masses which are not sticky but are more fluid and which are more easily discharged from the reactor. Thereby, the manufacture of tetramethyl lead is rendered significantly more safe and practicable.

The reaction is carried out in the liquid phase with the methyl chloride in a proportion of at least 1 mole per mole of alloy, usually from about 1.3 moles to about 6 moles, and preferably from about 1.3 moles to about 3 moles.

The temperature may be in the range of from about 60° C. to about 120° C., and preferably will be from about 80° C. to about 100° C.

The polyethers employed as the catalysts in the process of this invention may be represented by the formula $RO(CH_2CH_2O)_nR'$ wherein R is a member of the group consisting of hydrogen atoms an alkyl groups of 1–2 carbon atoms, R' is an alkyl group of 1–2 carbon atoms, and $n$ is an integer of 7–3, preferably 1–2. Also preferably, each of R and R' is an alkyl group of 1–2 carbon atoms, most preferably methyl groups. The polyether structure is critical, as monoethers such as dialkyl ethers (e.g., dimethyl ether), alkyl aryl ethers (e.g., anisole), and cyclic ethers (e.g., tetrahydrofuran), are ineffective as catalysts for the reaction of methyl chloride with monosodium lead alloy.

The polyethers, which are useful as catalysts in the process of this invention, include the mono- and di-alkyl ethers of ethylene glycol, diethylene glycol and triethylene glycol, where alkyl is methyl or ethyl, preferably the dimethyl ethers. Representative are: ethylene glycol monomethyl ether (methyl Cellosolve), diethylene glycol monomethyl ether (methyl Carbitol), ethylene glycol dimethyl ether (glyme), diethylene glycol dimethyl ether (diglyme), triethylene glycol dimethyl ether (triglyme), and ethylene glycol diethyl ether (1,2-diethoxyethane). Mixtures of any two or more of said polyethers may be used.

The said polyethers may be employed in the proportion of from 0.1 to about 1 mole per mole of alloy, preferably from about 0.2 to about 0.5 mole. Such quantities constitute at least several times the quantities disclosed as the preferred and optimum quantities by Kobetz et al. in U.S. Patent 3,192,240.

Monosodium lead alloy (NaPb) used in this process, i.e., containing 50 mole percent Na and 50 mole percent Pb, or on a weight basis 10% weight, Na and 90% weight Pb, has been amply described in the art. It may be used in various forms, usually comminuted, including ground as disclosed by Stecher in U.S. Patent 2,134,091, flaked as disclosed by Pyk in U.S. Patent 2,561,636 or by Tanner in U.S. Patent 2,635,107, and quenched (in MeCl) as described by Mattison in U.S. Patent 2,744,126.

The methyl chloride may contain rather large proportions of water. In contrast to prior practices regarding the alkylation of monosodium lead alloy, it is not critical for practical operation to exclude or limit moisture to very low levels. Methyl chloride, containing 50 p.p.m. (parts per million) or less of water, is generally considered in this art to be substantially anhydrous. For example, in aluminum-catalyzed methylations, it is considered desirable to limit the water content of the methyl chloride to less than 150 p.p.m. (0.015% weight) and in general to operate as anhydrously as possible, both costly expedients. In this invention, substantially greater quantities of $H_2O$ can be tolerated, for example corresponding to as high as about 500 p.p.m. based on the methyl chloride or about .005 mole/mole alloy. This has a commercially important advantage because the methyl chloride ordinarily contains small amounts of water and it is not economically practical to provide completely anhydrous methyl chloride.

Broadly, the overall process comprises (1) mixing the alloy, methyl chloride, and the polyether component, (2) holding such mixture at a temperature in the range of about 60° C. to about 120° C. at which the reaction begins and proceeds at a reasonable rate, and (3) recovering the tetramethyl lead from the reaction mass. Normally, the reaction is effected under agitation and it is usually desirable to effect the reaction in the presence of an inert solid, such as graphite, as an internal lubricant. From about 1–5% by weight of the alloy may be used, depending on the dimensions of the reactor, the effectiveness of the agitation means, and the proportions of the reactants. There may also be present a thermal stabilizer for tetramethyl lead, as described by Jarvie et al. in U.S. Patent 3,048,610 and Cook et al. in U.S. Patent 3,049,558, for example a volatile hydrocarbon, such as toluene or isooctane, having boiling characteristics comparable to those of tetramethyl lead.

The reactants, catalyst components and other agents as described above may be introduced separately or together, all at once or gradually during the course of the reaction. The catalyst components may be added as such or in a carrier which conveniently may be the methylating agent or an inert solvent, including the thermal stabilizers toluene and isooctane. Best results are obtained when the polyether and the methyl chloride are intimately mixed before being contacted with the alloy so as to insure good contact between these reagents and the alloy.

The reaction mass components may be mixed at temperatures at which the reaction does not proceed at a substantial rate, e.g., at 25° C. or below, and the mixture then brought to operating temperatures. Or the reactants and other essential components may be brought into contact at temperatures within the operating range. The reaction may be conducted batchwise or continuously.

Reaction mass temperatures are readily controlled by controlling the amount and schedule of catalyst and methyl chloride addition, by cooling where necessary, and by refluxing methyl chloride. The internal pressure should be sufficient to maintain the methyl chloride in the liquid phase, or under reflux pressure.

The resulting reaction mass may be worked up in the usual way described in the art. Normally, the residual methyl chloride is vented from the charge at a temperature in the range of about 25° C. to about 60° C. and is passed to a recovery system as in tetraethyl lead technology. For this purpose, the reaction mass temperature is adjusted accordingly. The tetramethyl lead is then recovered by solvent extraction, e.g., with toluene, or by steam distillation according to the well-known techniques.

In order to more clearly illustrate this invention, representative modes of practicing it and advantageous results to be obtained thereby, the following examples are given in which the parts and proportions are by weight except where otherwise stated.

EXAMPLE 1

The data tabulated below were obtained according to the following procedure, involving a stainless steel pressure reactor equipped with outer electrical heating means and inner thermocouples for measuring temperature, and adapted for agitation by shaking. The reactor volume is such that 100 parts methyl chloride (MeCl) corresponds to a loading density of 0.25 gr./cc.

One hundred parts crushed 10 on 20 mesh NaPb alloy and a polyether, as identified below, were added to the reactor under nitrogen. The reactor was closed, cooled to −70° C. and evacuated. Then 69 parts of methyl chloride, containing 45 p.p.m. $H_2O$ (0.00054 mole/mole NaPb), was weighed in from a pressurized supply. Agitation was started and the reaction mixture brought to reaction temperature in 10 to 15 minutes and held there for the time period indicated below. Reaction was terminated by cooling to −70° C. Tetramethyl lead was recovered by extracting the reaction products with toluene.

Typical results are shown in Table I.

TABLE I.—POLYETHER-CATALYZED MeCl-NaPb REACTION

Molar MeCl/NaPb=3.1
Reaction Temp./Time=85° C./2 hrs.

| Catalyst | Percent wt. on NaPb | Molar catalyst/ NaPb | TML yield, percent |
|---|---|---|---|
| None | | | Nil |
| MeOCH₂CH₂OMe | 9.8 | .25 | 93 |
| MeOCH₂CH₂OMe Plus toluene | 9.8 .9 | .25 | 95 |
| MeO(CH₂CH₂O)₂Me | 14.6 | .25 | 93 |
| MeO(CH₂CH₂O)₃Me | 10.0 | .13 | ¹19 |
| MeOCH₂CH₂OH | 5.0 | .12 | ¹26 |
| MeO(CH₂CH₂O)₂H | 13.0 | .20 | ¹50 |

¹ 1.5 hour runs.

These data show that the defined polyethers, particularly the dimethyl ethers, are effective catalysts for this reaction.

In contrast, when simple monoethers, such as dimethyl ether, anisole (MeOC₆H₅) and tetrahydrofuran, were employed, substantially no TML was obtained.

EXAMPLE 2

A steel bomb was charged with (a) 100 parts crushed 10 on 20 mesh NaPb enclosed in a glass ampoule and (b) 23.5 parts 1,2-diethoxyethane (.46 mole/mole NaPb). The bomb was cooled to −70° C., its atmosphere evacuated, and 130 parts MeCl containing 94 p.p.m. H₂O (.001 mole H₂O/mole NaPb) were admitted from a pressurized source, corresponding to a loading density of 0.52 gm. MeCl/cc. of bomb capacity. At about 0° C., the closed bomb was struck sharply against a solid object to break the ampoule, placed in a preheated 85° C. oil bath, and its contents vigorously agitated by shaking for one hour. Reaction was terminated by cooling to −70° C. and the tetramethyl lead was recovered in 29% yield by extracting the reaction mass with toluene.

It will be understood that the preceding examples are given for illustrative purposes solely, and that this invention is not limited to the specific embodiments described therein. On the other hand, it will be readily apparent to those skilled in the art that, subject to the limitations set forth in the general description, many variations and modifications can be made in the polyethers, proportions, conditions, and procedures employed without departing from the spirit and scope of this invention.

From the foregoing description and examples, it will be apparent that this invention provides a new and improved process for the manufacture of tetramethyl lead which overcomes problems of the processes of the prior art. Particularly, the process of this invention avoids the hazards of prior processes and makes it possible to produce tetramethyl lead in a relatively safe and more practical manner. Thus, it appears that this invention constitutes a valuable advance in and contribution to the art.

The embodiments of the invention in which an exclusive property or privilege is claimed are defined as follows:

1. The process for making tetramethyl lead which comprises reacting monosodium lead alloy in the absence of any other metal other than incidental impurities inadvertently introduced by the specified reactants or the reaction equipment with:
    (a) a methylating agent which consists essentially of methyl chloride in the liquid phase, employing at least 1 mole of methyl chloride per mole of alloy,
    (b) at a temperature of from about 60° C. to about 120° C.
    (c) in the presence of from 0.1 to about 1 mole per mole of alloy of a catalyst which consists essentially of at least one polyether of the formula

RO(CH₂CH₂O)ₙR′ wherein R is a member of the group consisting of hydrogen atoms and alkyl groups of 1–2 carbon atoms, R′ is an alkyl group of 1–2 carbon atoms, and n is an integer of 1–3.

2. The process for making tetramethyl lead which comprises reacting monosodium lead alloy in the absence of any other metal other than incidental impurities inadvertently introduced by the specified reactants or the reaction equipment with:
    (a) a methylating agent which consists essentially of methyl chloride in the liquid phase, employing at least 1 mole of methyl chloride per mole of alloy,
    (b) at a temperature of from about 80° C. to about 100° C.
    (c) in the presence of from about 0.2 to about 0.5 mole per mole of alloy of a catalyst which consists essentially of at least one polyether of the formula RO(CH₂CH₂O)ₙR′ wherein R is a member of the group consisting of hydrogen atoms and alkyl groups of 1–2 carbon atoms, R′ is an alkyl group of 1–2 carbon atoms, and n is an integer of 1–3.

3. The process for making tetramethyl lead which comprises reacting monosodium lead alloy in the absence of any other metal other than incidental impurities inadvertently introduced by the specified reactants or the reaction equipment with:
    (a) a methylating agent which consists essentially of methyl chloride in the liquid phase, employing at least 1 mole of methyl chloride per mole of alloy,
    (b) at a temperature of from about 60° C. to about 120° C.
    (c) in the presence of 0.1 to about 1 mole per mole of alloy of a catalyst which consists essentially of at least one polyether of the formula RO(CH₂CH₂O)ₙR′ wherein each of R and R′ is an alkyl group of 1–2 carbon atoms and n is an integer of 1–3.

4. The process for making tetramethyl lead which comprises reacting monosodium lead alloy in the absence of any other metal other than incidental impurities inadvertently introduced by the specified reactants or the reaction equipment with:
    (a) a methylating agent which consists essentially of methyl chloride in the liquid phase, employing at least 1 mole of methyl chloride per mole of alloy,
    (b) at a temperature of from about 80° C. to about 100° C.
    (c) in the presence of about 0.2 to about 0.5 mole per mole of alloy of a catalyst which consists essentially of at least one polyether of the formula

RO(CH₂CH₂O)ₙR′ wherein each of R and R′ is an alkyl group of 1–2 carbon atoms and n is an integer of 1–3.

5. The process for making tetramethyl lead which comprises reacting monosodium lead alloy in the absence of any other metal other than incidental impurities inadvertently introduced by the specified reactants or the reaction equipment with:
    (a) a methylating agent which consists essentially of methyl chloride in the liquid phase, employing at least 1 mole of methyl chloride per mole of alloy,
    (b) at a temperature of from about 60° C. to about 120° C.
    (c) in the presence of from 0.1 to about 1 mole per mole of alloy of a catalyst which consists essentially of at least one polyether of the formula

RO(CH₂CH₂O)ₙR′ wherein R is a member of the group consisting of hydrogen atoms and alkyl groups of 1–2 carbon atoms, R′ is an alkyl group of 1–2 carbon atoms, and n is an integer of 1–3 and
    (d) up to about 0.005 mole of water per mole of alloy.

6. The process for making tetramethyl lead which comprises reacting monosodium lead alloy in the absence of any other metal other than incidental impurities inadvertently introduced by the specified reactants or the reaction equipment with:
(a) a methylating agent which consists essentially of methyl chloride in the liquid phase, employing at least 1 mole of methyl chloride per mole of alloy,
(b) at a temperature of from about 60° C. to about 120° C.
(c) in the presence of 0.1 to about 1 mole per mole of alloy of a catalyst which consists essentially of at least one polyether of the formula $RO(CH_2CH_2O)_nR'$ wherein each of R and R' is an alkyl group of 1–2 carbon atoms and $n$ is an integer of 1–3 and
(d) up to about 0.005 mole of water per mole of alloy.

7. The process for making tetramethyl lead which comprises reacting monosodium lead alloy in the absence of any other metal other than incidental impurities inadvertently introduced by the specified reactants or the reaction equipment with:
(a) a methylating agent which consists essentially of methyl chloride in the liquid phase, employing at least 1 mole of methyl chloride per mole of alloy,
(b) at a temperature of from about 80° C. to about 100° C.
(c) in the presence of about 0.2 to about 0.5 mole per mole of alloy of a catalyst which consist essentially of at least one polyether of the formula $$CH_3O(CH_2CH_2O)_nCH_3$$

and $n$ is an integer of 1–2 and
(d) up to about 0.005 mole of water per mole of alloy.

8. The process for making tetramethyl lead which comprises reacting monosodium lead alloy in the absence of any other metal other than incidental impurities inadvertently introduced by the specified reactants or the reaction equipment with:
(a) a methylating agent which consists essentially of methyl chloride in the liquid phase, employing at least 1 mole of methyl chloride per mole of alloy,
(b) at a temperature of from about 80° C. to about 100° C.
(c) in the presence of about 0.2 to about 0.5 mole per mole of alloy of a catalyst which consists essentially of ethylene glycol dimethyl ether and
(d) up to about 0.005 mole of water per mole of alloy.

9. The process for making tetramethyl lead which comprises reacting monosodium lead alloy in the absence of any other metal other than incidental impurities inadvertently introduced by the specified reactants or the reaction equipment with:
(a) a methylating agent which consists essentially of methyl chloride in the liquid phase, employing at least 1 mole of methyl chloride per mole of alloy,
(b) at a temperature of from about 80° C. to about 100° C.
(c) in the presence of about 0.2 to about 0.5 mole per mole of alloy of a catalyst which consists essentially of diethylene glycol dimethyl ether and
(d) up to about 0.005 mole of water per mole of alloy.

References Cited

UNITED STATES PATENTS

| | | | |
|---|---|---|---|
| 1,559,405 | 10/1925 | Calcott | 260—437 |
| 2,535,190 | 12/1950 | Calingaert et al. | 260—437 |
| 2,535,191 | 12/1950 | Calingaert et al. | 260—437 |
| 2,535,192 | 12/1950 | Calingaert et al. | 260—437 |
| 2,635,106 | 4/1953 | Shapiro et al. | 260—437 |
| 3,192,240 | 6/1965 | Kobetz et al. | 260—437 |

TOBIAS E. LEVOW, *Primary Examiner.*

H. M. S. SNEED, *Assistant Examiner.*